(12) United States Patent
Marcinkowski

(10) Patent No.: US 11,001,436 B2
(45) Date of Patent: May 11, 2021

(54) BEVERAGE CARTRIDGE

(71) Applicant: Keurig Green Mountain, Inc., Burlington, MA (US)

(72) Inventor: Stanley Michael Marcinkowski, Peabody, MA (US)

(73) Assignee: Keurig Green Mountain, Inc., Burlington, MA (US)

(*) Notice: Subject to any disclaimer, the term of this patent is extended or adjusted under 35 U.S.C. 154(b) by 0 days.

(21) Appl. No.: 15/593,772

(22) Filed: May 12, 2017

(65) Prior Publication Data
US 2017/0355515 A1 Dec. 14, 2017

Related U.S. Application Data

(60) Provisional application No. 62/347,729, filed on Jun. 9, 2016.

(51) Int. Cl.
| | |
|---|---|
| *B65D 85/80* | (2006.01) |
| *B65B 29/02* | (2006.01) |
| *B65D 43/02* | (2006.01) |
| *A47J 31/40* | (2006.01) |
| *B65D 85/804* | (2006.01) |

(52) U.S. Cl.
CPC ........ *B65D 85/8043* (2013.01); *A47J 31/407* (2013.01); *B65B 29/02* (2013.01); *B65B 29/022* (2017.08); *B65D 43/02* (2013.01)

(58) Field of Classification Search
CPC .. B65D 85/8043; B65D 43/02; B65D 85/804; B65D 85/8046; A47J 31/407; B65B 29/02
See application file for complete search history.

(56) References Cited

U.S. PATENT DOCUMENTS

| | | | | |
|---|---|---|---|---|
| 2001/0048957 | A1* | 12/2001 | Lazaris | B65D 85/8043 426/77 |
| 2006/0188609 | A1* | 8/2006 | Jordan | D21H 27/08 426/77 |
| 2010/0237069 | A1* | 9/2010 | Helou, Jr. | B65D 65/466 220/200 |

(Continued)

FOREIGN PATENT DOCUMENTS

| | | |
|---|---|---|
| CN | 1681425 A | 10/2005 |
| WO | WO 2004/026091 A1 | 4/2004 |
| WO | WO 2014/093321 A1 | 6/2014 |

OTHER PUBLICATIONS

International Search Report and Written Opinion dated Oct. 10, 2017 in connection with International Application No. PCT/US2017/036388.

*Primary Examiner* — Ericson M Lachica
(74) *Attorney, Agent, or Firm* — Wolf, Greenfield & Sacks, P.C.

(57) ABSTRACT

A beverage cartridge and method for forming a beverage cartridge. An outer cup may be made of paper and a polymer liner provided at the inner space of the cup. The liner may define an interior space that is closed by a lid, and the liner and lid may be impervious to moisture and gases, e.g., to protect a beverage material in the interior space. A filter may be attached to the liner and/or lid, and the liner may be peelably removable from the cup. The liner, filter and/or lid may be removable together from the cup.

29 Claims, 2 Drawing Sheets

(56) References Cited

U.S. PATENT DOCUMENTS

| | | | |
|---|---|---|---|
| 2010/0239717 A1* | 9/2010 | Yoakim | B65D 85/8043 426/84 |
| 2010/0288131 A1 | 11/2010 | Kilber et al. | |
| 2010/0303964 A1* | 12/2010 | Beaulieu | B65D 85/8043 426/77 |
| 2011/0033580 A1* | 2/2011 | Biesheuvel | A23F 5/18 426/77 |
| 2011/0041702 A1* | 2/2011 | Yoakim | B65D 85/8043 99/302 R |
| 2011/0259205 A1* | 10/2011 | Delorme | B65D 65/466 99/299 |
| 2011/0274794 A1* | 11/2011 | Gerbaulet | B65D 85/8043 426/115 |
| 2012/0058226 A1* | 3/2012 | Winkler | A47J 31/3695 426/79 |
| 2012/0070542 A1* | 3/2012 | Camera | B65D 85/8043 426/77 |
| 2012/0097602 A1 | 4/2012 | Tedford | |
| 2013/0209618 A1* | 8/2013 | Trombetta | B32B 1/02 426/115 |
| 2014/0141128 A1* | 5/2014 | Trombetta | B65B 1/02 426/77 |
| 2014/0161936 A1* | 6/2014 | Trombetta | B65D 85/816 426/77 |
| 2014/0161940 A1* | 6/2014 | Aviles | B65D 81/3233 426/115 |
| 2014/0272018 A1* | 9/2014 | Koller | B65D 85/8043 426/115 |
| 2014/0287099 A1* | 9/2014 | Trombetta | B65D 85/8043 426/87 |
| 2014/0342060 A1* | 11/2014 | Bartoli | B65D 85/8043 426/115 |
| 2014/0356484 A1* | 12/2014 | Capitani | B65D 85/8043 426/77 |
| 2014/0377414 A1* | 12/2014 | Walters | B65D 85/8043 426/115 |
| 2016/0325898 A1* | 11/2016 | Footz | B65D 65/466 |
| 2017/0297811 A1* | 10/2017 | Fu | B65D 85/8043 |
| 2018/0118450 A1* | 5/2018 | Trombetta | B65D 85/8046 |

* cited by examiner

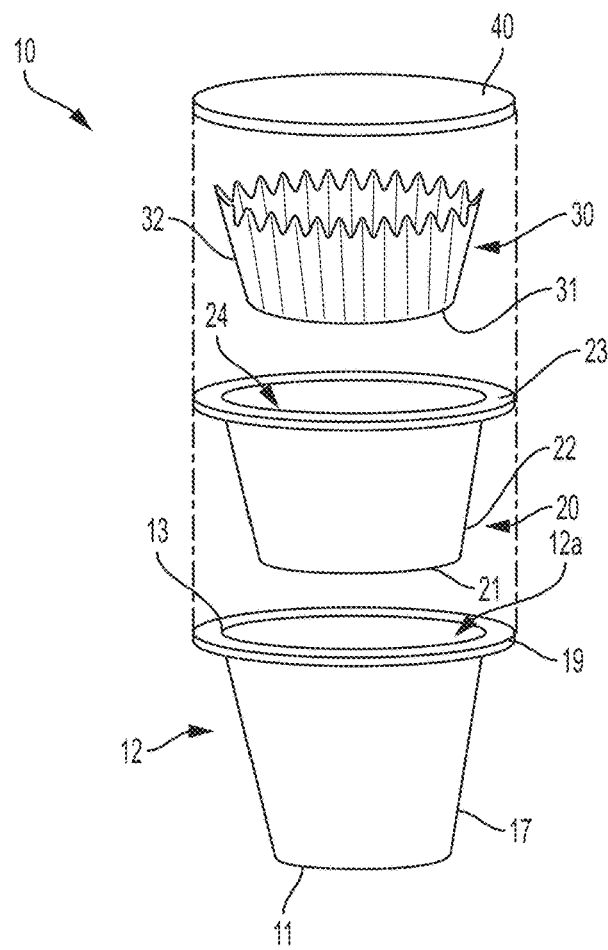
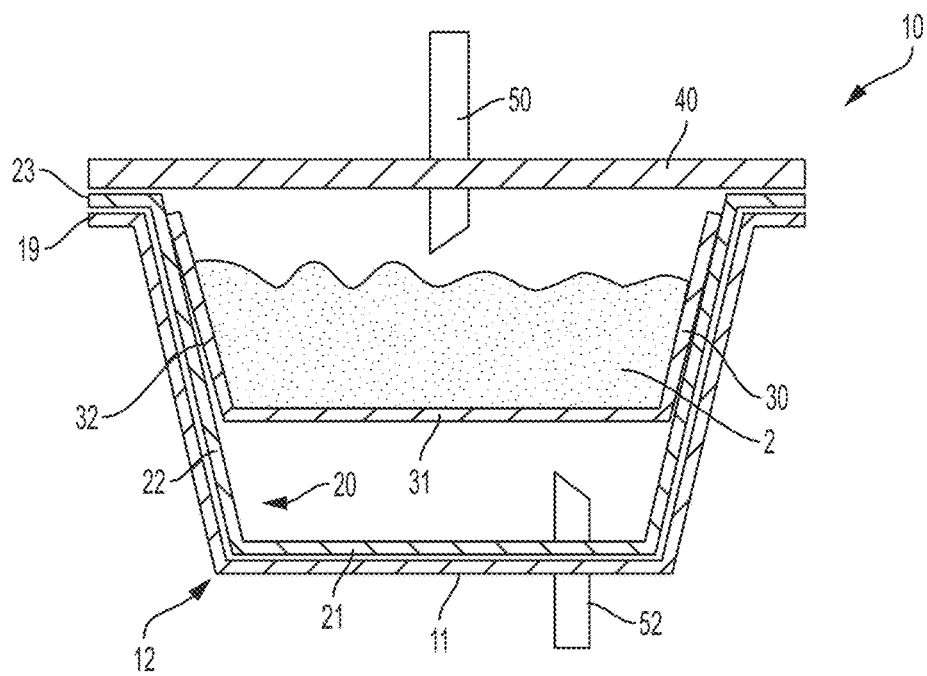

BEVERAGE CARTRIDGE

CROSS REFERENCE TO RELATED APPLICATION

This application claims the benefit of U.S. Provisional Application No. 62/347,729, filed Jun. 9, 2016, which is hereby incorporated by reference in its entirety.

BACKGROUND

1. Field of Invention

This invention relates to a beverage cartridge to be used with a beverage forming system, such a single-serve coffee maker.

2. Related Art

Cartridges for use with beverage forming machines are well known, and may include one or more filters as well as a beverage material, such as ground coffee beans, tea leaves, etc. In some cartridges, the filter is located between two or more portions of an interior space of the cartridge, e.g., one portion in which a beverage material is located, and a second portion into which liquid that has passed through the filter may flow. An example of one such cartridge is disclosed in U.S. Pat. Nos. 5,840,189 and/or 6,607,762, which may be used with a beverage making machine like that described in U.S. Pat. No. 7,398,726.

SUMMARY OF INVENTION

The inventors have appreciated that many beverage cartridges do not permit separation of beverage cartridge components after use, e.g., for recycling and/or composting, and/or many beverage cartridges include materials that cannot be recycled or composted. For example, commonly available beverage cartridges include polymer components that cannot be recycled, e.g., because of the combination of materials in the polymer composite. Beverage cartridges that are recyclable and/or compostable have been proposed, such as cartridges that are permeable and made entirely of a paper material. The problem with such cartridges, however, is that the cartridges themselves are incapable of preserving the quality of any beverage material contained in the cartridge for an extended period. That is, paper is permeable to moisture and gases, such as oxygen, and many beverage materials, such as coffee grounds, are sensitive to contamination by moisture, oxidation or other environmental conditions that might ruin the beverage material's ability to make a quality drink. As a result, a permeable cartridge, such as a conventional tea bag-type device or coffee pod, is incapable of maintaining roast and ground coffee fresh for much more than a few days or a week even when exposed to the relatively benign conditions of the typical kitchen cabinet. The result is that paper or other cartridges made of permeable material must be packed in a secondary container, such as an overwrap that provides an impermeable barrier to moisture and/or gases.

In accordance with one aspect of the invention, a cartridge includes a cup having a bottom and a sidewall extending upwardly from the bottom to a top. The sidewall and bottom define an inner space and are formed in part of cellulose fiber, e.g., such that the cup is pervious to moisture and gases. A liner may be located in the inner space of the cup, with the liner including a bottom, a sidewall extending upward from the bottom to a top edge, and a flange extending outwardly from the top edge of the sidewall. The liner may include a polymer material, e.g., so the liner is impervious to moisture and gases, and the liner may be bonded to the bottom and sidewall of the cup. A lid may be bonded to the flange of the liner and close an interior space defined by the liner, with the lid being impervious to moisture and gases and bonded to the liner so as to render the interior space impervious to moisture and gases. In at least some embodiments, a "pervious" element such as a cup formed of cellulose fiber allows for moisture and/or gases in storage conditions of a typical household to pass through the element in a way that ground coffee stored in the pervious element would spoil, be unacceptable for forming a quality coffee beverage or otherwise noticeably change after more than 2-4 weeks. In contrast, an "impervious" element such as a liner or lid described above would resist the passage of moisture and/or gases through the impervious element in storage conditions of a typical household so as to allow ground coffee stored within the impervious element to be used in forming a quality coffee beverage or have no noticeable change in beverage-forming characteristics even after 4-6 weeks or more. In some embodiments, the liner may be removable from the cup by peeling the liner by hand from the cup. Additionally, the lid and the liner may be removable together by peeling or otherwise pulling the liner from the cup. The lid may be bonded to the liner by an unpeelable bond, e.g., so the lid cannot be removed from the liner without damage to the lid or liner, or may be attached by a peelable bond.

In some embodiments, the cup further includes a cup flange extending outwardly from the top of the cup sidewall. The flange of the liner may be unattached to the cup flange, e.g., to aid in separating the liner flange from the cup flange, but in other embodiments may be bonded together. The bottom of the cup and the bottom of the liner may be arranged to be pierced by an outlet needle of a beverage machine. In some embodiments, the liner includes polyethylene and EVOH and the bottom of the liner has a thickness of 0.001 to 0.004 inches or less. In some cases, the bottom of the liner has a thickness that is less than a thickness of the sidewall of the liner. Alternately or in addition, a thickness of the liner may taper from an upper region of the sidewall to a lower region of the sidewall.

In some embodiments, a filter may be located in the interior space and attached to the sidewall of the liner. A beverage material may be in the interior space and arranged to mix with liquid introduced into the cartridge to form a beverage, e.g., coffee grounds, tea, soluble beverage materials, etc. may be located in the interior space. The filter may be attached to the liner by an unpeelable bond, or by a peelable bond, and the filter and the liner may be removable from the cup by peeling the liner from the cup. The filter may have a direct attachment to the liner only, e.g., by heat welding to the liner sidewall only. The filter may have a filter sidewall and a filter bottom, and the filter bottom may be positioned above the bottom of the liner.

In another aspect of the invention, a method of forming a beverage cartridge includes providing a cup having a bottom and a sidewall extending upwardly from the bottom to a top. The sidewall and bottom may define an inner space and be formed in part of cellulose fiber, e.g., such that the cup is pervious to moisture and gases. A liner may be provided in the cup in the inner space of the cup, with the liner including a bottom, a sidewall extending upward from the bottom to a top edge, and a flange extending outwardly from the top edge of the sidewall. The liner may define an interior space, and include a polymer material, e.g., so as to be impervious to moisture and gases. The liner may be attached to the cup by bonding the liner to the bottom and sidewall of the cup so that the liner is peelably removable from the cup. A beverage material may be provided in the interior space, with the beverage material arranged to mix with liquid introduced into the cartridge to form a beverage. A lid may be attached to the flange of the liner to close the interior space defined by the liner, with the lid being impervious to moisture and gases and attached to the liner so as to render the interior space impervious to moisture and gases. Other features of the cartridge noted above may be included as well.

These and other aspects of the invention will be apparent from the following description and claims.

BRIEF DESCRIPTION OF DRAWINGS

Aspects of the invention are described below with reference to the following drawings in which like numerals reference like elements, and wherein:

FIG. 1 is an exploded perspective view of in accordance with aspects of the invention;

FIG. 2 is a side cross-sectional view of the cartridge of FIG. 1; and

DETAILED DESCRIPTION

Figure 3:
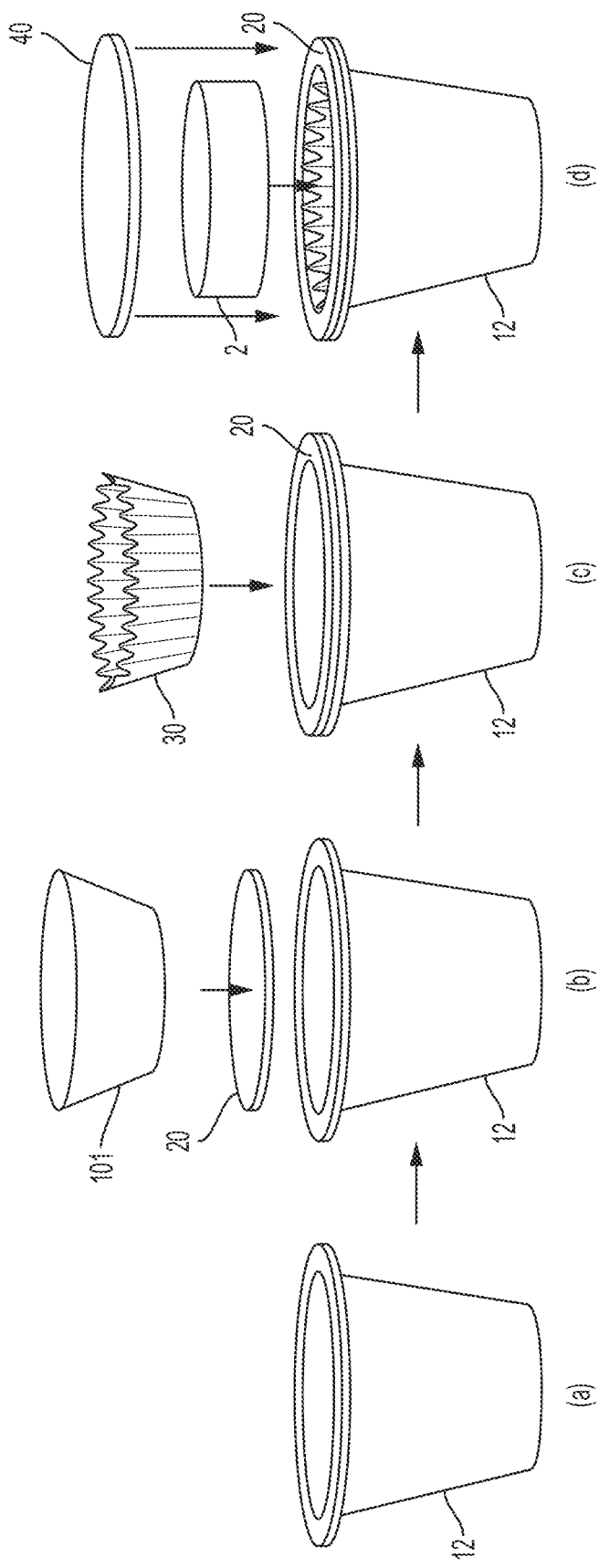
FIG. 3 schematically illustrates steps in a method of manufacturing a cartridge in accordance with aspects of the invention.

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

FIGS. 1 and 2 show an exploded perspective view and a side cross-sectional view, respectively, of an illustrative cartridge 10 that incorporates one or more aspects of the invention. The cartridge 10 may be used in a beverage machine to form any suitable beverage such as tea, coffee, other infusion-type beverages, beverages formed from a liquid or powdered concentrate, etc. Thus, the cartridge 10 may contain any suitable beverage material 2, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In one illustrative embodiment, the cartridge 10 contains a beverage material 2 that is configured for use with a machine that forms coffee and/or tea beverages, however, aspects of the invention are not limited in this respect.

In this illustrative embodiment, the cartridge 10 includes a cup 12 that includes an inner space 12a. As one example, the cup 12 may have a frustoconical shape with a flat bottom 11, and a sidewall 17 that extends upwardly from the bottom 11 to a top of the sidewall where an opening 13 to the inner space 12a is defined. In this embodiment, the cup 12 also includes a rim or flange 19 that extends outwardly from the top of the sidewall 17, but such a rim or flange 19 is optional. It should be understood that in other embodiments, the cup 12 may have other shapes, sizes or other features. For example, the cup 12 may have a conical or cylindrical shape, may be in the form of a square or rectangular cup, a domed cup, a sphere or partial sphere, an irregular shape, or other suitable form, may have a fluted, corrugated, or otherwise shaped sidewall, and so on. The bottom 11 need not be flat, but may be ribbed, corrugated, include one or more recesses (e.g., a central recess that extends into the inner space 12a), and so on. Also, the cup 12 need not necessarily be rigid or relatively stiff so as to have a defined shape, but rather may be relatively compliant. For example, although the cup 12 in this embodiment has a relatively rigid and/or resilient construction so that the cup 12 tends to maintain its shape, the cup 12 could be made to have a more compliant and/or deformable arrangement, e.g., like a sachet container made from a sheet of deformable material.

In this embodiment, the cup 12 is formed at least in part of paper or other cellulose fibers, e.g., in a way similar to paperboard or corrugated cardboard material. Thus, the cup 12 may be recyclable and/or compostable in a way similar to corrugated cardboard material. Generally speaking, the cup 12 in this embodiment may be arranged to provide structural support for the cartridge 10 so as to define a shape and size of the cartridge 10. So, while the cup 12 may be somewhat compliant or crushable, the cup 12 may have sufficient stiffness to allow the cartridge 10 to be handled, placed in the cartridge holder of a beverage machine, and pierced by one or more elements, such as an outlet needle, to introduce liquid into and allow beverage to exit the cartridge 10.

The cartridge 10 also includes a liner 20 that is positioned in the inner space 12a of the cup 12. The liner 20 may be provided in different ways, and may provide a barrier to moisture and gases such as oxygen. Thus, the liner 20 may be impermeable or impervious to moisture and air to allow a beverage material 2 such as coffee grounds in the interior space 24 of the liner 20 to be stored for a period of 1-2 months or more without noticeable degradation or other effect on the beverage material 2 by ambient moisture or air. This is in contrast to the cup 12, which like other paperboard or cardboard products may be permeable or pervious to moisture and air. In one embodiment, the liner 20 may be made of a polyethylene and EVOH laminate, or may be made of polypropylene, or other suitable polymer materials or combinations of such materials. The liner 20 need not be relied on to provide structural integrity for the cartridge 10 and so may be made relatively thin, e.g., having a thickness of 0.001 to 0.004 inches or less at the bottom 21 and/or sidewall 22 of the liner.

In this embodiment, the liner 20 is attached to the inner surface of the cup 12 at the bottom 21 and sidewall 22, e.g., by heat welding. If the cup 12 includes a rim 19, a flange 23 of the liner 20 may be attached to the rim 19. However, in this illustrative embodiment, the flange 23 is not attached to the rim 19, which may allow a user to more easily grasp the flange 23 of the liner 20 to separate the liner 20 from the cup 12. That is, while the liner 20 is attached to the inner surface of the cup 12, the attachment provides a peelable bond that allows the liner 20 to be separated from the cup 12. Separation of the liner 20 may cause some portions of the cup 12 to remain attached to the liner 20, or separation of the liner 20 may occur so that all portions of the cup 12 remain with the main cup body. Other aids to grasping the liner 20 may be provided, such as one or more tabs extending from the flange 23 to provide a gripping surface. Of course, if the cup 12 is not provided with a rim 19, the flange 23 of the liner 20 may be more easily grasped by a user so that the user can pull the liner 20 from the cup 12. In some embodiments, the cup 12 sidewall 22 may be pressed radially inwardly, e.g., by a user's finger, to help separate the liner 20 and cup 12 in at least one local area to aid in removal of the liner 20. For example, a user may grasp the cup 12 on opposite sides of the sidewall 22, e.g., between thumb and forefinger, and squeeze the opposite sides together. This may partially deform the cup 12 and help separate the liner 20 from the cup 12. Thereafter, a user may grasp the liner 20, e.g., at the flange 23, to pull the liner 20 from the cup 12. In some embodiments, the cup 12 may have a textual or other indication of where a user should depress the cup sidewall 22, e.g., "press here" text may be printed on the cup sidewall 22 or a dimple, divot, depression of other physical feature may be provided on the cup sidewall 22 to indicate where radial force should be applied.

In this embodiment, the cartridge 10 also includes a filter 30 that is provided in the interior space 24 of the liner 20. The filter 30 may be arranged in a variety of different ways, and in this case is configured to separate first and second chambers or portions of the interior space 24 from each other, at least in a flow-wise sense. That is, the filter 30 may be arranged so that liquid in a first chamber must pass through the filter 30 to enter a second chamber, e.g., to exit the cartridge. In this illustrative embodiment, a first chamber is located above the filter 30 and a second chamber is located below the filter 30 so that liquid introduced at a top of the cartridge 10 enters the first chamber, and flows downwardly through the filter 30 to the second chamber. It should be understood, however, that other additional chambers in the interior space 24 and/or sub-portions or areas of the first and second chambers, may be provided in other embodiments. For example, it is possible for the cartridge 10 to have three spaces that are separated by two filters, walls or other structures (e.g., a first perforated wall may separate two portions of a first chamber and a second filter may separate the first and second chambers), and so on. In another embodiment, the first or second chamber may be separated into two portions by a venturi or other feature that introduces air into a beverage. Thus, the first and/or second chambers (or additional chambers) may be divided or otherwise separated into two or more portions or areas by filters, walls, dividers, passageways, and other features.

In this illustrative embodiment, the filter 30 may have a substantially frustoconical shape with fluted or pleated sidewall 32 and a generally flat bottom 31, as shown. However, the filter 30 may have any suitable shape, such as a cylindrical shape, a square cup shape, a domed shape, a flat sheet, or other. The filter 30 may be the attached to portions of the cartridge 10 in any suitable way, such as by an adhesive, thermal welding, ultrasonic welding, chemical bonding, crimping or other mechanical bonding, etc. In this illustrative embodiment, the filter 30 may include a permeable filter paper made of a combination of polypropylene and cellulose materials, though other polymer, metal or other materials can be used.

In this illustrative embodiment, the filter 30 is attached to the sidewall 22 of the liner 20, e.g., by heat welding. For example, the filter 30 may have a cup-shape with an upper portion of the sidewall 32 welded to the sidewall 22 of the liner 20 at a location below the flange 23 of the liner 20. In another arrangement, the filter 30 may be attached to the flange 23 of the liner 20 or in other locations. Attachment of the filter 30 may be made using a removable, or peelable, bond, or an unremovable bond such that damage to the filter 30 and/or liner 20 would occur upon separating or attempting to separate the two at the attachment. The filter 30 may function to remove materials over a certain size from a liquid, e.g., may remove coffee grounds from liquid in a first chamber, allowing a coffee beverage to pass through the filter 30 to the second chamber. For example, the filter may include a piece of filter paper that is arranged to allow a liquid and dissolved and/or suspended materials of a certain size to pass, yet prevent relatively large particles from flowing through the filter. Of course, the filter 30 may have multiple stages, e.g., a coarse filter portion that filters out relatively large particles, followed by a fine filter portion that filters relatively smaller particles, and so on. In addition, the filter 30 may include one or more portions that function to filter liquid passing through the filter 30, as well as portions that are impermeable or otherwise restrict flow. Thus, the filter 30 may include two or more separate components, if desired. For example, the filter 30 may include a rigid, impermeable plastic sleeve that is attached to the liner sidewall 22 and a porous filter paper may be attached to the sleeve, e.g., at a bottom of the sleeve. Thus, not all portions of the filter need be permeable to liquids. The filter 30 may also have areas with different permeability, e.g., to help direct flow toward one or more areas of the filter 30. For example, upper regions of the filter 30 may have a relatively lower permeability as compared to lower regions. This may help encourage flow through the beverage material 2 toward lower regions of the filter 30, potentially improving the dissolution of materials into the liquid.

The filter 30 may also, or alternately, function to help prevent the movement of beverage materials from the second chamber to the first chamber. For example, the cartridge 10 may include a beverage material 2 in the second chamber (e.g., below the filter 30 in FIGS. 1 and 2) and no beverage material 2 in the first chamber. In this case, the filter 30 may help prevent contact of the beverage material 2 with a needle or other liquid inlet that pierces the cartridge 10 introduce water or other liquid into a top of the cartridge 10. For example, some beverage media 2, such as powdered drink mixes, can clog or otherwise foul an inlet needle if allowed to contact the needle. The filter 30 may help prevent such contact, helping to maintain proper operation of the cartridge and preparation of a beverage. In other embodiments, a filter may be positioned at the bottom of the liner 20, i.e., lying directly on top of the bottom of the liner. Such a filter may be resistant to puncture by an outlet needle that pierces the bottom of the cup and liner, e.g., the filter may be contacted by the needle and move inwardly with the needle, away from the bottom of the liner, and without being pierced. In other arrangements, a filter guard may be provided between the filter and liner that helps resist damage to the filter by a piercing element. Of course, in yet other embodiments, no filter may be provided at all in the cartridge.

In this embodiment, the interior space 24 of the liner 20 is closed by a lid or cover 40 that is attached to the flange 23 of the liner 20. The bond between the lid 40 and the flange 23 may be formed in any suitable way, such as by welding, adhesive, etc., and may be peelable or not peelable, i.e., an unpeelable bond may prevent the separation of the lid 40 from the liner 20 without damage to either the lid 40 or the liner 20. As noted above, the filter 30 may be attached in a variety of ways in the cartridge 10. In some embodiments, the filter 30 may be attached to the lid 40 like that described in U.S. Patent application publication 2012/0058226 and/or U.S. Pat. No. 6,607,762. For example, the filter 30 may be attached to the lid 40 only, and be unattached to any other portion of the cartridge 10. Alternately, the filter 30 may be attached to the flange 23 of the liner 20 and to the lid 40, e.g., so the filter 30 is sandwiched between the lid 40 and flange 23. In some cases, the lid 40 and filter 30 may be removable together separate from the liner 20 and cup 12, e.g., by peeling the lid 40 from the liner 20. Alternately, the lid 40, filter 30 and liner 20 may be removable together separate from the cup 12.

Like the liner 20, the lid 40 may provide a barrier to moisture and/or gases, such as oxygen. For example, the liner 20 and/or lid 40 may be made of a polymer laminate, e.g., formed from a sheet including a layer of polystyrene or polypropylene and a layer of EVOH and/or other barrier material, or may be made of a laminate of a metallic foil and a polymer, or may be made of a metal only such as aluminum. Such an arrangement may provide suitable protection for the beverage material 2, if provided, e.g., from unwanted exposure from moisture, oxygen and/or other materials. It should be understood, however, that the lid 40 and/or liner 20 may be made of other materials or combinations of materials, such as biopolymers, compostable polymers, paper, foils, etc. Both the lid 40 and liner 20 may be made relatively thin, e.g., at the bond between the lid 40 and the flange 23 of the liner 20 as well as at other locations. For example, the lid 40 and/or liner 20 may be made of a flexible sheet of material and have a thickness of 0.005 to 0.02 inches. Thus, the lid 40 and liner 20 may be relatively flimsy or structurally weak and provide little or no structural strength for the cartridge 10.

When using the cartridge 10 to form a beverage, the lid 40 and/or the cup 12 and liner 20 may be pierced to introduce liquid into the cartridge and receive beverage from the cartridge. (As used herein, "beverage" refers to a liquid substance intended for drinking that is formed when a liquid interacts with a beverage material. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.) To introduce liquid into the cartridge, for example, as shown in FIG. 2, a portion of the lid 40 may be pierced by an inlet piercing element 50 (e.g., a needle) so that water or other liquid may be injected into the cartridge 10. Other inlet piercing arrangements are possible, such as multiple needles, a shower head, a non-hollow needle, a cone, a pyramid, a knife, a blade, etc. A beverage machine that uses the cartridge may include multiple piercing elements of the same type or of different types, as the invention is not limited in this respect. In another arrangement, a beverage machine may include a piercing element (such as a spike) that forms an opening and thereafter a second inlet element (such as a tube) may pass through the formed hole to introduce liquid into (or conduct liquid out of) the container. In other embodiments, the lid 40 may be pierced, or otherwise effectively opened for flow, by introducing pressure at an exterior of the lid 40. For example, a water inlet may be pressed and sealed to the lid 40 exterior and water pressure introduced at the site. The water pressure may cause the lid 40 to be pierced or otherwise opened to allow flow into the cartridge 10. In another arrangement, the lid 40 may include a valve, conduit, port or other structure that opens when exposed to a suitable pressure and/or when mated with a water inlet tube or other structure.

The cartridge 10 may also be penetrated by an outlet piercing element 52 (e.g., a needle) at the bottom 11 of the cup 12 and the bottom 21 of the liner 20, or in alternative embodiments at a second portion of the lid 40 apart from the inlet opening in a way like that shown in FIG. 3 of U.S. Patent application publication 2012/0058226. As with the inlet piercing arrangement, the outlet piercing arrangement may be arranged in any suitable way, e.g., an inlet may be formed at a bottom of the cup 12, at a sidewall 22 of the liner 20, etc., and an outlet may be formed at a sidewall of the liner 20, at the lid 40, or other locations. Like the inlet piercing element 50, the outlet piercing element 52 may include one or more hollow or solid needles, knives, blades, tubes, and so on. Alternately, the cartridge 10 may include a valve, septum or other element that opens to permit beverage to exit when liquid is introduced into the cartridge, but otherwise remains closed (e.g., to protect the beverage material from external conditions such as oxygen, moisture or others). In such a case, no piercing element for forming the outlet opening is necessarily required although may be used, e.g., to allow the valve or other element to open. Also, in this illustrative embodiment the piercing element 52 remains in place to receive beverage as it exits the opening formed in the interior space 24. However, in other embodiments, the piercing element 52 may withdraw after forming an opening, allowing beverage to exit the opening and be received without the piercing element 52 being extended into the cartridge 10.

As also described in U.S. Patent application publication 2012/0058226, the cartridge may include an element, e.g., a flow distributor, that helps to distribute liquid that is introduced into the cartridge to the beverage material and/or that helps resist contact of a fluid inlet with the beverage material. In the illustrative embodiment shown in FIGS. 1-3 of U.S. 2012/0058226, the cartridge includes a flow distributor 33 that is positioned between the inlet 50 and the beverage material. The flow distributor may be formed of a permeable material, such as a filter paper, that is attached to the lid 40 at a location where an inlet opening is formed. Thus, the flow distributor can help prevent the streaming of incoming liquid in a single direction (or two or more specific directions) that might cause the liquid to "tunnel" through the beverage material 2. Such "tunneling" can cause a short circuit where liquid does not sufficiently interact with the beverage material 2, resulting in an unacceptably weak product. The flow distributor may take other forms, however, such as a perforated disc placed on the beverage material 2, a piece of filter paper placed on the beverage material 2, a perforated sheet attached to the liner sidewall above the beverage material 2, and others. Thus, the flow distributor need not be attached to the lid 40 or the filter 30, but instead may be simply placed in the first chamber with the beverage material 2. In addition, or alternately, the inlet needle 50 or other fluid inlet may be arranged to help distribute water or other liquid, e.g., by directing multiple streams in several different directions across the beverage material, and so on. The flow distributor may be arranged to be contacted by the inlet needle 50, or to avoid contact with the needle 50. If the flow distributor contacts the needle 50, it may include materials that are sufficiently tough and/or sufficiently rigid to reduce damage to the flow distributor by the inlet needle 50. Non-limiting examples of such a material include: a material that is flexible, but tough; a material that is rigid, but brittle; a material that is stretchable or resilient, but tear resistant; a material that is tough and rigid, etc.

The cartridge 10 may be used with a suitable beverage machine, such as any one that is capable of introducing chilled, carbonated and/or heated water into the cartridge and receiving a formed beverage from the cartridge. In one aspect of the invention, a cartridge may be used to form a beverage while the cartridge is positioned with the lid 40 above the cup 12, as shown generally in FIG. 2. However, the cartridge 10 could be used with the lid 40 (or a portion of the lid) lying in a vertical plane, or at other angles to the horizontal, including orientations in which the cup 12 is positioned above the lid 40.

Although FIG. 2 shows an embodiment in which beverage material 2 is located only in a first chamber of the interior space 24 above a filter, beverage material (either the same or different as that in the first chamber) may be provided in a second chamber below the filter 30 or other portions of the cartridge. For example, a cartridge may include roast and ground coffee in a first chamber, and a creamer and sweetener in the second chamber, enabling the cartridge to form a cappuccino- or latte-like beverage. In another embodiment, the first chamber may include coffee grounds and the second chamber may include a hot chocolate material, allowing the cartridge to form a mocha-type beverage. Other combinations will occur to those of skill in the art, such as leaf tea in the first chamber and a dried fruit material in the second chamber, a dried fruit material in the first chamber and creamer/sweetener in the second chamber, and so on. In some embodiments, another filter may be provided, e.g., to separate beverage media in the second chamber from the fluid outlet.

Another aspect of the invention includes a method of manufacturing a cartridge. FIG. 3 schematically illustrates steps in a method of forming a cartridge in an illustrative embodiment. In step (a), a cup 12 is provided having a bottom and a sidewall extending upwardly from the bottom to a top. The sidewall and bottom may define an inner space and may be formed, at least in part, of cellulose fiber. For example, the cup may be formed from recycled corrugated cardboard fibers, in which case, the cup will be pervious or permeable to moisture and gases, such as liquid water, water vapor and oxygen. The cup may or may not include a rim or flange at a top of the sidewall that extends radially outwardly from the sidewall.

In step (b), a liner 20 may be provided in the inner space of the cup. The liner 20 may include a bottom, a sidewall extending upward from the bottom to a top edge, and a flange extending outwardly from the top edge of the sidewall. In some cases, the shape of the liner may match or be similar to a shape of the inner space of the cup, or may be different. The liner may define an interior space, e.g., to receive a beverage material used to form a beverage. The liner 20 may include a polymer material, such as a polyethylene and EVOH laminate, that is impervious or impermeable to moisture and gases. In one embodiment, and as illustrated schematically in FIG. 3, the liner 20 may be formed from a flat piece of material, such as a blank that is cut from a flat polymer sheet. The blank may have any suitable shape, such as a circular or disc shape, and may have an initial thickness that is equal to a thickness of the polymer sheet from which the blank is cut, e.g., a thickness of 0.01 to 0.02 inches. The blank may be drawn or otherwise formed to create a desired shape for the liner 20. For example, the flat, circular shape of the blank may be formed to create a cup-shape for the liner 20 having a bottom, sidewall and flange. In this embodiment, the blank may be drawn or otherwise formed by heating the blank and using a tool 101 to press the heated blank into the inner space of the cup 12. This action may not only form the bottom, sidewall and flange portions of the liner, but also attach the bottom and sidewall of the liner 20 to the cup 12. As an example, the heated blank may be clamped or otherwise secured at its outer periphery in an area that subsequently forms the flange of the liner. The tool 101, which may itself be heated and have a cup-shape that closely conforms to the shape of the inner space of the cup 12, may be pressed against a central portion of the blank located inside of the clamped flange portion so that the heated blank is drawn downwardly and into the cup 12 while the flange portion remains outside of the inner space of the cup 12. This action may cause the tool 101 to press the bottom and sidewall portions of the liner 20, which are formed by the tool 101, against the bottom and sidewall portions of the cup 12, thereby bonding the liner 20 to the cup 12 at least in bottom and/or sidewall areas. Drawing of the blank may cause the bottom and sidewall of the liner have a thickness that is less than the initial thickness of the blank. However, the flange 23 may have a thickness that is equal to the initial thickness of the blank, which may provide more structural strength to the flange 23 than other portions of the liner 20. In addition, the bottom of the liner 20 may have a thickness that is less than a thickness at the sidewall. Also, a thickness of the sidewall may taper so as to be thicker in upper regions than in lower regions of the sidewall. Although not shown, the cup 12 may itself be placed in a support having a cup-shaped recess so that the cup 12 is supported and is not excessively stressed while the liner 20 is pressed into place in the inner space. The liner 20 may be attached to the cup 12 inner surface so that the liner 20 is peelably removable from the cup, e.g., by hand by a user and without the use of tools and/or heat. A heat activated or other bonding agent may be used between the cup 12 and liner 20, or materials in the cup 12 and liner 20 may themselves form a suitable bond, e.g., in response to heat and pressure.

Of course, the liner 20 may be formed in other ways, such as by vacuum thermoforming, molding, and others, and the liner 20 may be formed to have a particular cup-like or other shape prior to insertion into the cup 12. Thus, the pre-formed liner 20 may be inserted into the cup inner space after the liner is provided with a cup-like or other desired shape. The liner 20 may or may not be attached to a rim of the cup (if the cup has a rim).

In step (c), an optional filter 30 may be provided in the interior space of the liner 20. While a filter 30 is not required, the filter 30 may be attached to the liner 20, such as by welding, adhesive, etc. the filter to the sidewall of the liner 20 at a location below the flange 23. Alternately, the filter 30 may be attached to a lid 40 that is attached to the liner 20, e.g., a portion of the filter 30 may be sandwiched between the flange 23 of the liner 20 and the lid 40, or the filter 30 may be attached to the lid 40 alone and not be directly attached to the liner 20. The filter 30 may take a variety of forms as discussed above, and in this embodiment has a cup shape with a fluted sidewall and flat bottom. The filter 30 may be positioned in the interior space so that a bottom or other portion of the filter 30 is located to avoid contact with any inlet or outlet piercing element that penetrates the cartridge to form a beverage. Alternately, the filter may make contact with a piercing element, e.g., may take the form of a sponge-like disc that is dropped into the bottom of the liner 20.

In step (d), a beverage material 2 is provide in the interior space, and a lid 40 is attached to the liner 20 to seal the interior space 24 of the liner 20 closed. In this embodiment, the beverage material 2 is provided into a space defined by the filter 30, but may be provided in the interior space 24 below the filter 30, or may be provided alone without any filter 30. The lid 40 may be attached to the flange 23 of the liner 20 to close the interior space so that the lid and liner together render the interior space impervious or impermeable to moisture and gases. This may be particularly useful where the cup 12 provides little or no barrier to moisture or gases.

Subsequent to formation of the cartridge, such as after forming a beverage, the liner together with a filter (if provided) and/or the lid may be peeled from the cup. This may be done by pulling on the flange of the liner relative to the cup to pull the liner from the inner space of the cup. In some cases, the cup sidewall may be pressed radially inwardly, e.g., to partially deform the cup sidewall. This action may help separate the liner from the cup, at least in the area of deformation, and may help make removal of the liner from the cup easier. Alternately, the cup 12 may be torn, e.g., at a perforation, and pulled from the liner 20. In another embodiment, a portion of the lid 40 may be grasped and pulled together with the liner 20 from the cup 12. In other cases, the lid 40, or a portion of the lid 40, may be removed from the liner 20 so that any remaining beverage material 2 may be removed from the interior space, and thereafter the liner may be grasped and removed from the cup 12. This may allow components of the cartridge, e.g., a metallic foil lid 40, compostable coffee grounds 2, recyclable polymer liner 20 and filter 30, and recyclable paper cup 12 to be separated from each other.

It should be understood that steps in the method outlined in FIG. 3 may be performed in any suitable order. For example, in one embodiment, the beverage material 2 may be provided in a space defined by the filter 30 before the filter 30 is attached to the lid 40, and then the lid 40, filter 30 and beverage material 2 may be assembled to the liner 20. In another embodiment, the beverage material may be provided into a space defined by the filter after the filter is attached to the lid. For example, the lid may be attached to the lid and the beverage material provided into a space defined by the filter through an opening in the lid. Thereafter, the opening in the lid may be closed.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage cartridge configured to form a beverage, comprising:
    a cup having a bottom and a sidewall extending upwardly from the bottom to a top, the sidewall and bottom defining an inner space and formed in part of cellulose fiber, the cup being pervious to moisture and gases;
    a liner located in the inner space of the cup, the liner including a liner bottom, a liner sidewall extending upward from the liner bottom to a liner top edge, and a liner flange extending outwardly from the liner top edge, the liner including a polymer material and the liner being attached to the bottom or sidewall of the cup, the liner being impervious to moisture and gases; and
    a lid attached to the liner flange and closing an interior space defined by the liner, the lid being impervious to moisture and gases and attached to the liner flange so as to render the interior space impervious to moisture and gases;
    wherein the liner is removable from the cup by peeling the liner by hand from the cup, and wherein the bottom of the cup and the liner bottom are configured to be pierced by an outlet needle of a beverage machine.

2. The cartridge of claim 1, wherein the cup further includes a cup flange extending outwardly from the top of the cup sidewall.

3. The cartridge of claim 2, wherein the liner flange is unattached to the cup flange, and the lid is unattached to the cup flange.

4. The cartridge of claim 1, wherein the liner includes polyethylene and ethylene vinyl alcohol (EVOH) and the liner bottom has a thickness of 0.001 to 0.004 inches.

5. The cartridge of claim 1, wherein the lid and the liner are removable together by peeling the liner from the cup.

6. The cartridge of claim 1, wherein the lid is bonded to the liner flange by an unpeelable bond.

7. The cartridge of claim 1, further comprising a filter located in the interior space and attached to the liner sidewall; and
    a beverage material in the interior space and arranged to mix with liquid introduced into the beverage cartridge to form a beverage.

8. The cartridge of claim 7, wherein the filter is attached to the liner by an unpeelable bond.

9. The cartridge of claim 7, wherein the filter and the liner are removable from the cup by peeling the liner from the cup.

10. The cartridge of claim 7, wherein the filter has a direct attachment to the liner only.

11. The cartridge of claim 7, wherein the lid is removable from the liner to open the interior space and allow the beverage material to be removed from the interior space without the filter.

12. The cartridge of claim 7, wherein the filter is heat welded to the liner.

13. The cartridge of claim 7, wherein the filter has a filter sidewall and a filter bottom, and wherein the filter bottom is positioned above the liner bottom.

14. The cartridge of claim 1, wherein the liner bottom has a thickness that is less than a thickness of the liner sidewall.

15. The cartridge of claim 1, wherein a thickness of the liner tapers from an upper region of the liner sidewall to a lower region of the liner sidewall.

16. The cartridge of claim 1, wherein the liner is attached to the bottom and the sidewall of the cup.

17. A beverage cartridge configured to form a beverage, comprising:
    a cup having a bottom and a sidewall extending upwardly from the bottom to a top, the sidewall and bottom defining an inner space and formed in part of cellulose fiber, the cup being pervious to moisture and gases;
    a liner located in the inner space of the cup, the liner including a liner bottom, a liner sidewall extending upward from the liner bottom to a liner top edge, and a liner flange extending outwardly from the liner top edge, the liner including a polymer material and the liner bottom being attached to the bottom of the cup so that the liner bottom is configured to be pierced with the bottom of the cup by an outlet needle of a beverage machine, the liner being impervious to moisture and gases; and
    a lid attached to the liner flange and closing an interior space defined by the liner, the lid being impervious to moisture and gases and attached to the liner flange so as to render the interior space impervious to moisture and gases;

wherein the liner is removable from the cup by peeling the liner by hand from the cup.

18. The beverage cartridge of claim 17, wherein the liner sidewall is attached to the sidewall of the cup.

19. A method of forming a beverage cartridge, comprising:
   providing a cup having a bottom and a sidewall extending upwardly from the bottom to a top, the sidewall and bottom defining an inner space and formed in part of cellulose fiber, the cup being pervious to moisture and gases;
   attaching a liner to the cup in the inner space of the cup, the liner including a liner bottom, a liner sidewall extending upward from the liner bottom to a liner top edge, and a liner flange extending outwardly from the liner top edge, the liner defining an interior space, including a polymer material and being impervious to moisture and gases, attaching the liner to the cup including bonding the liner to the bottom or sidewall of the cup so that the liner is peelably removable from the cup and the bottom of the cup and the liner bottom are pierceable by an outlet needle of a beverage machine;
   providing a beverage material in the interior space, the beverage material being arranged to mix with liquid introduced into the beverage cartridge to form a beverage; and
   attaching a lid to the liner flange to close the interior space defined by the liner, the lid being impervious to moisture and gases and attached to the liner flange so as to render the interior space impervious to moisture and gases.

20. The method of claim 19, further comprising:
   forming the liner by cutting a blank from a polymer sheet having an initial thickness; and
   drawing the blank to form the bottom, sidewall and flange for the liner.

21. The method of claim 20, wherein the step of drawing includes heating the blank and using a tool to press the heated blank into the inner space of the cup and attach the liner bottom and the liner sidewall to the cup.

22. The method of claim 20, wherein the liner bottom and the liner sidewall have a thickness that is less than the initial thickness.

23. The method of claim 20, wherein the blank has a circular shape, and the step of drawing includes heating the blank, securing a flange portion of the blank, and using a tool to form the liner sidewall and the liner bottom relative to the flange portion.

24. The method of claim 19, further comprising:
   attaching a filter to the liner sidewall in the interior space.

25. The method of claim 24, wherein the step of providing the beverage material includes providing the beverage material into a space defined by the filter.

26. The method of claim 24, wherein the filter is heat welded to the liner sidewall.

27. The method of claim 24, further comprising peeling the liner and the filter together from the cup.

28. The method of claim 19, wherein the cup includes a flange that extends outwardly from the top of the cup sidewall, and wherein the flange of the liner is unattached to the flange of the cup.

29. The method of claim 19, further comprising peeling the liner from the cup by pulling on the liner flange.

* * * * *